US009911037B2

(12) United States Patent
Kempinski

(10) Patent No.: US 9,911,037 B2
(45) Date of Patent: Mar. 6, 2018

(54) SYSTEM AND METHOD OF FEEDBACK FOR ATTENTION AND CONCENTRATION

(71) Applicant: UMOOVE SERVICES LTD., Jerusalem (IL)

(72) Inventor: Yitzchak Kempinski, Geva Binyamin (IL)

(73) Assignee: Umoove Services Ltd., Jerusalem (IL)

( * ) Notice: Subject to any disclaimer, the term of this patent is extended or adjusted under 35 U.S.C. 154(b) by 54 days.

(21) Appl. No.: 15/051,244

(22) Filed: Feb. 23, 2016

(65) Prior Publication Data

US 2016/0275349 A1    Sep. 22, 2016

Related U.S. Application Data

(60) Provisional application No. 62/119,281, filed on Feb. 23, 2015.

(51) Int. Cl.
*G06K 9/00* (2006.01)
(52) U.S. Cl.
CPC ..... *G06K 9/00604* (2013.01); *G06K 9/00912* (2013.01)
(58) Field of Classification Search
CPC .............. G06K 9/00912; G06K 9/00604
USPC ........................................................ 382/128
See application file for complete search history.

(56) References Cited

U.S. PATENT DOCUMENTS

| 5,850,211 A | * | 12/1998 | Tognazzini | ............. G06F 3/013 |
| | | | | 345/158 |
| 9,507,418 B2 | * | 11/2016 | Yu | ............................ G06F 3/013 |
| 2007/0121066 A1 | * | 5/2007 | Nashner | ............... A61B 3/0091 |
| | | | | 351/210 |
| 2016/0277850 A1 | * | 9/2016 | Li | .......................... H04R 25/40 |

OTHER PUBLICATIONS

Evangelos Skodras, Eye Localization, Nov. 27, 2014, Version 1.0, retrieved on Jun. 5, 2017 from Internet from URL:<https://play.google.com/store/apps/details?id=org.opencv.eyelocvasko>.*

* cited by examiner

*Primary Examiner* — Gregory F Cunningham
(74) *Attorney, Agent, or Firm* — Pearl Cohen Zedek Latzer Baratz LLP

(57) ABSTRACT

A system and method of tracking a viewer's focus and attention by displaying an object on a screen and instructing the user to look at such object. A camera captures an image of an eye of the user as he looks at the object, and then captures one or more further images of the eye of the user to determine when or if the user looked away from the object. A duration of time during which the user looked at the object may be used as a measure of focus or attention of the user.

15 Claims, 2 Drawing Sheets

Fig. 3

Block 300    an object is displayed on an electronic display

Block 302    an instruction is issued to look at the object

Block 304    capture an image of eyes of a user

Block 306    determine from the image that the viewer is looking at the object

Block 308    track the eyes of the viewer in further images

Block 310    determine whether the user has looked away from the object

Fig 4.

Block 400    capturing a first image of an eye of a user;

Block 402    instructing a user to look at an object on an electronic display;

Block 404    displaying the object on the electronic display

Block 406    capturing a second image of the eye of the user after the instruction;

Block 408    determining from the second image that the user is looking at the object Block 410    calculating a time between the instruction and the capturing of the second image.

SYSTEM AND METHOD OF FEEDBACK FOR ATTENTION AND CONCENTRATION

CROSS REFERENCE TO RELATED APPLICATIONS

This application claims priority form U.S. Provisional Patent Application No. 62/119,281 filed on Feb. 23, 2015 and entitled 'SYSTEM AND METHOD OF FEEDBACK FOR ATTENTION AND CONCENTRATION', incorporated herein by reference in its entirety.

BACKGROUND

A tendency towards distraction by visual stimulus may be correlated with a reduced capacity for extended concentration and cognitive learning. Some theories maintain that improvements in visual attention and focus may improve concentration faculties and reduce a propensity towards distraction. Manual methods of exercising visual attention do not provide sufficient feedback to a user about his actual attention, focus and distraction rates.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

FIG. 3 is a flow diagram in accordance with an embodiment of the invention; and

FIG. 4 is a flow diagram in accordance with an embodiment of the invention.

EMBODIMENTS OF THE INVENTION

Figure 1:
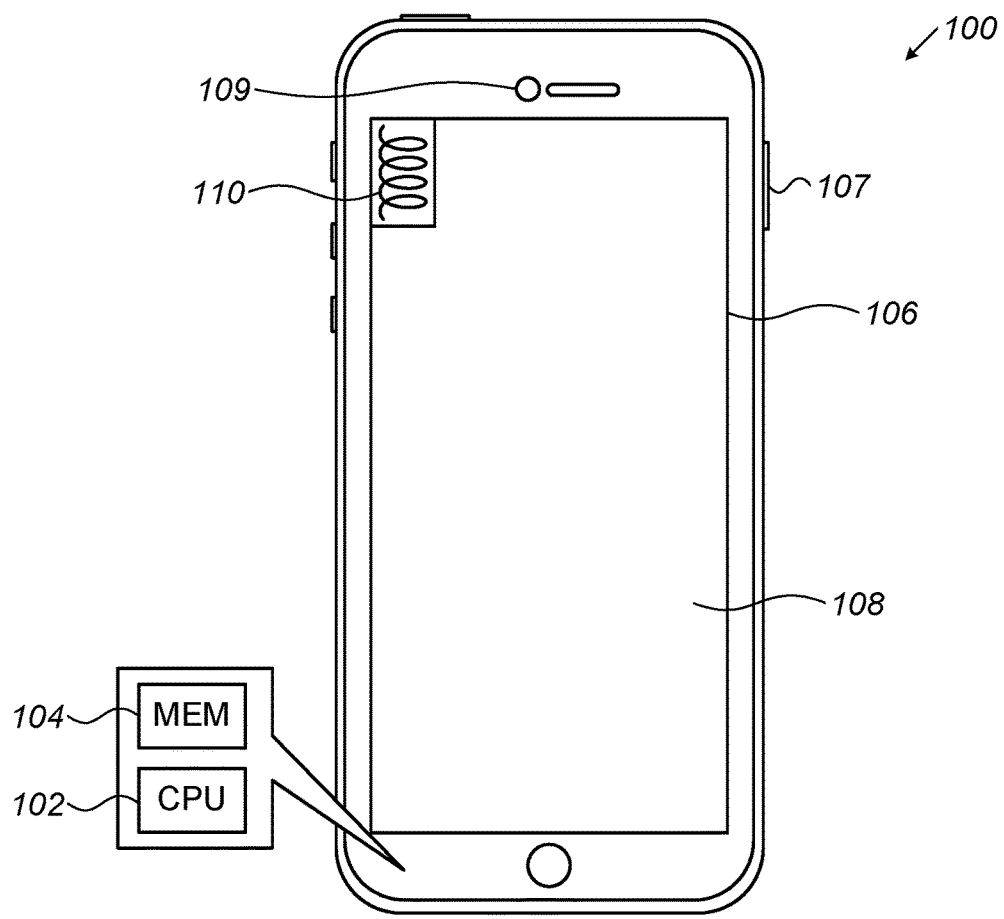
FIG. 1 is a schematic diagram of a system in accordance with an embodiment of the invention.

Reference is made to FIG. 1, a schematic diagram of a system in accordance with an embodiment of the invention. Embodiments of the invention may include a computing device 100 such as a desk top computer, laptop computer, tablet, smart cellular telephone or other computing device. Device 100 may include one or more processors 102, one or more memory units 104, a display or screen 106, a speaker 107 or other sound reproduction device, a keyboard, touchscreen or other input device 108, an image capture device such as one or more still or video cameras 109, and possibly an antenna 110 or other connection to a network, such as for example a cellular network, local wireless network or the Internet.

Figure 2:
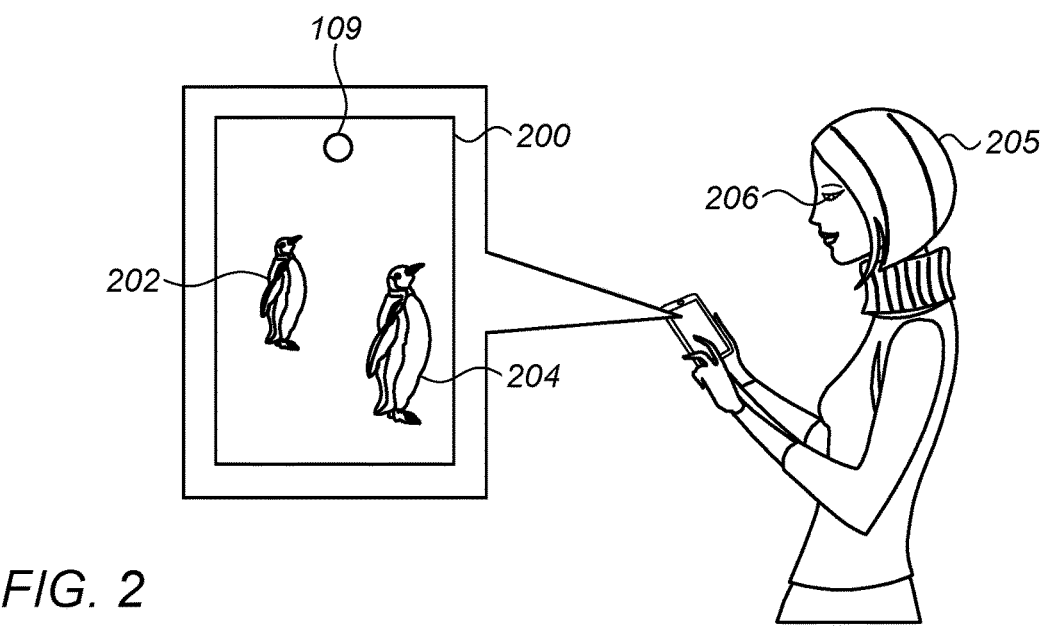
FIG. 2 is a depiction of a screen that includes one or more focus objects presented to a viewer, in accordance with an embodiment of the invention.

Reference is made to FIG. 2, a depiction of a screen that includes one or more focus objects presented to a viewer, in accordance with an embodiment of the invention. Screen or display 200 may show or depict one or more viewable objects 202 and 204 that may be seen by a viewer looking at display 200. In some embodiments objects 202 and 204 may be or include drawings, animations or other depictions of shapes, animals, people, objects. Objects 202 and 204 may be shown in one or different colors from each other, in a single or multiple colors or hues, in flashing or changing colors or shapes, or in any combination of the above or other combinations or variations. Other number of objects may be shown on display 200. Objects 202 and 204 may be shown in stationary positions or moving on display 200. In some for example a object 202 may be shown on a right or top side of screen 200, and object 204 may be shown on a left or bottom of screen 200. Other combinations are possible.

In operation, one or more objects 202 and 204 may appear or be shown on display 200. A signal such as an audible signal from speaker 107 may be transmitted to a user 205 to look at or view an object 202, and camera 109 may capture one or more images of one or both eyes 206 of the user 205. A position of one or both eyes 206 may be determined by processor 102 from one or more images captured by camera 109 at a start, end or during a period that user 205 was instructed to look at object 202. In some embodiments, another instruction may be presented to user 205 to look at object 204. Camera 109 may capture another one or more images of eyes 206 at a start, end or during a period when, or for a duration of the period for which, the user was told to look at object 204, and processor 102 may determine a position of eyes during such period. Display 200, speaker 107 or some other output device associated with device 100 may provide feedback to the user 205 as to whether user 205 looked at the object in accordance with the instruction during all, some or none of the duration of the relevant period of the instruction. In some embodiments, a response time or attentiveness of the user to the instruction may be measured to determine how long it took the user to look at object 204, and whether the user looked at the correct object. Processor 102 may record a duration of the period for which user 205 managed to look at the object without looking away or being distracted from looking at the object.

In some embodiments, images may be captured on a periodic or intermittent basis, and a calculation of a position of eyes 206 in such images may be made for some or all of such images.

For example, in some embodiments object 202 may be or include a yellow bird shown on the left side of display 200, and object 204 may be or include a blue bird shown on the right side of display 200. Speaker 107 may issue an instruction "yellow", and camera 109 may capture one or more images of eyes 206. Speaker 107 may then issue an instruction "blue". Camera 109 may capture one or more images of eyes 206, for example soon before the "blue" instruction was given, soon after the "blue" instruction was given and at intervals thereafter. Processor 102 may calculate a position or series of movements of eyes 206 for some or all of the captured images and may correlate the determined position of eyes 206 with the instructions that were provided. A point of gaze of one or more or eyes of a user may be calculated at one or more times relative to the giving of the instruction and the point of gaze of the user may be compared with the position of the object 204 that was the subject of the instruction. A compliance by eyes 206 with the instruction may be determined from on a position or series of movements of eyes 206 at a relevant time, and an indication of a compliance may be signaled to the user. In some embodiments a user may be instructed to look at object 204 until a further instruction is provided. Upon a detection that one or both eyes of a user have moved away from a focus during a relevant period when an instruction was in effect for the user to look at a particular object 202, a notification or signal may be issued to the user, and for example the exercise may be started again, or a new exercise may be presented. In some embodiments, feedback may be provided to the user in real time upon a detection that the user has looked away for a short period. In some embodiments a signal may be issued to a user that his point of gaze is drifting or has drifted away from object 204, even though the user may not have been aware of such drift. Such feedback may be provided during or after an instruction or after a 'round' of exercise and between a next round. In some embodiments an exercise or round of play may earn points or other competitive incentives for the user to improve his concentration or avoidance of distraction.

In some embodiments, if a user successfully looks at or focuses on the relevant object for some, part or all of the relevant period in compliance with the instruction and without looking away or being distracted from looking away from the object 202, an exercise may continue or may be advanced so that the exercise becomes harder or more challenging. If the user 205 is unsuccessful in complying with the instruction or once the user becomes distracted or looks away from the object without being told to do so, the exercise may restart or regress in difficulty so that by practice and feedback a user may improve his focus compliance and the duration of a period for which he is able to concentrate on, look at and focus on a particular object without being distracted or looking away from the object. In some embodiments, a measurement may be taken of the user's response time to look at the object and accuracy to an instruction to look at one or more objects 202 or from one object to another.

In some embodiments, an object 202 may be moved across, around or in other patterns or directions on display 200. Camera 109 may capture images of eyes 206 as they view screen 200, and processor 102 may detect whether the eyes are following the object and that a position or pattern of movement of eyes 206 as they follow object 202 while it is moving, conform to a smooth pursuit pattern. Such detection of smooth pursuit eye movements during a period when object 202 was moving may be taken as an indicator that eyes 206 were focused on and following the moving object 202. In some embodiments, a capture, calculation and tracking of a position or movement of an eye, or a change from one position to another or in a pattern such as a smooth pursuit pattern may be implemented in accordance with a method described in US patent application entitled "System and Method for Tracking of Eyes", filed on Sep. 7, 2014 and published as WO 2013/111140. For example, a method of tracking one or both eyes may be implemented to detect a movement of the eyes in a smooth pursuit. A duration, direction and/or time of a detected smooth pursuit of one or both eyes may be correlated and compared to a time and duration of a movement of the relevant object shown on the display. A detection of for example a saccadic eye movement or some other movement, during a period when an relevant object is moving on a screen may be taken as an indication that the user is not focusing on the relevant moving object.

In another example, to detect that a user is focusing on a stationary object on the screen, the eyes should be detected as either (i) fixated, or (ii) in a narrow band of smooth pursuit to compensate for possible movement of the screen, such as may occur if there is a movement of the user's head or if a hand-held screen is moved relative to the user's head. As part of such detection, the position of the iris or eye-center may be calculated relative to for example a corner of the eye socket or relative to a bridge of a nose or other location on the user's face. A lock or continued focus on a stationary displayed object on the screen may be evidenced by a smooth movement of the eye(s) relative to the eye corner or other known location on the face if the screen is moved or if the head is moved relative to the screen. A movement of the screen may also be detected by for example an accelerometer of the device or by a change in a background captured in an image of the user.

If a first instruction is given to the user to look at for example the blue object, and then a second instruction is given to look at the yellow object, a calibration of the focus or gaze-point of the eyes may be made from images captured slightly in advance of giving the second instruction when the eyes were focused on the blue object in compliance with the first instruction. The second instruction may be given very soon after such calibration of gaze at the first object, and the gaze of the user at the second object may be confirmed with for example the gaze detection method described below and in the attached Exhibit A or other gaze detection methods. Once the user's gaze is confirmed as focused on the second object, the continued focus by the user on the object of the second instruction may be detected or confirmed by detecting that the eyes are either (i) fixated or (ii) in a narrow band of smooth pursuit to compensate for possible movement of the screen, as is described above.

In some embodiments, a method of determining a point of gaze of eyes may be performed in accordance with one or more methods described in the provisional patent application attached hereto as Exhibit A, and entitled System and Method for Detecting a Gaze of a Viewer.

An increase in a complexity or duration of a movement of an object on a display may be implemented as a user increases his capacity to concentrate or focus on and follow the object on a display. A feedback on the relative progress of the user in his efforts to retain a focus or concentration on the moving displayed object may be provided by an output device such as a speaker that is associated with the display. In some embodiments, the feedback may report to the user the duration of his focus or concentration, and may encourage him to do better next time, and then start a new or repeated exercise. In some embodiments, one or more thresholds of attention, compliance, duration or other measures may be charted and for example presented to the user as goals of exercises. The measures or challenges may be increased or altered once reached or exceeded.

In some embodiments, in order to start a session, a user may have to for example click on or touch the displayed object that is the subject of the first instruction. The camera may capture an image of the user's eyes when he clicks on such object, and the tracking of the eyes may start at the time when the system may know or assume that the user is in fact looking at the designated object. From such time and forward during the duration of the instruction, the system may rely on detecting either (i) fixation of the eyes or (ii) smooth pursuit to compensate for movement of the display, as is described above. If a saccadic movement, or some other eye movement that is inconsistent with a focus on the relevant object, is detected during a period wherein the user is instructed to look at an object, such movement may be indicative of a focus by the user away from the relevant object, and may be result in a signal to the user that he has failed the exercise.

If a user is able to focus on an object for longer and longer periods without looking away from it, such may be an indication that the user is able to concentrate for longer periods without distraction. Such exercise may be used by persons who have difficulty with concentration, such as persons suffering from Attention Deficit Disorder or other disorders that limit a power of concentration.

In some embodiments, objects may appear or be flashed or moved around on a screen or display as distractions from an instruction to focus or concentrate on a particular object.

Other dynamic changes in the required levels of focus and concentration may increase, decrease or maintain a level of difficulty of the exercise to match the user's ability, or to push the user to advance his concentration capacity. For example, a system may detect that a user has mastered a certain level of focus concentration, and then present the user with more difficult tasks. Types or styles of exercise may include repeating a same command, issuing unrelated or randomized commands, issuing different commands to look at a same object, issuing commands that uncoordinated with an order of appearing objects. In some embodiments, mastering a certain exercise or level of exercise may include repeating performance of such exercise or level over for example a period of days or weeks, or in succession without failures.

In some embodiments, a tracking of one or both eyes may determine a position of the eye(s) at a time that approximates the time that the instruction is provided to the user. The tracking function may determine a position of the eyes at or near the time of perception by the eyes of the object, such as several milliseconds after the instruction is given or the object appears on the screen. The tracking method may then continue to determine if there has been a movement of the eyes from such determined location during a duration of the instruction to focus on the object. A movement in position of the eyes during such period may indicate that the user has lost focus or concentration on the object.

In some embodiments, a method may be used to test a peripheral view capacity of a user. For example, when the system detects that the user is viewing an object in for example a central part of the user's vision, there may be displayed on a side or peripheral part of the screen a second object, and the user may be asked to confirm whether he saw the second object. In some embodiments a user may be instructed to look at an object in for example a center of a screen, and then be instructed to look at an object that may be in a peripheral view of the viewer so that the viewer may be able to vaguely see the object. If there is a detection that the user looked towards the peripheral view area following such later instruction, such may be used as a determination that the user saw or looked towards the peripheral view. If the viewer indicated that he saw the object but the system detected that the viewer did not look at the object, such may be an indication that the viewer saw the object only from his peripheral vision.

Reference is made to FIG. 3, a flow diagram of a method of detecting whether a user is looking at a displayed object, in accordance with an embodiment of the invention. In block 300 an object may be displayed on an electronic display. In block 302, an instruction may be issued upon a signal from a processor to look at such object. In block 304, an imager at a known position and orientation to the display may capture an image of for example one or both eyes of a user or viewer of the display after the instruction is given. In block 306 a processor may determine from the image that the viewer is looking at the object. In block 308, a processor may track the eyes of the viewer in further images captured of the user. In block 310, a processor may determine from such images whether the user has looked away from the object.

In some embodiments the object may be displayed on a mobile electronic display, and the images may be captured by an imager at a known position relative to the electronic display.

In some embodiments, a user may, after looking at the first object, be asked to look at a second object on the screen. A further image or images may be captured of the user or viewer at, right before, or proximate to a time of the second instruction, and a calibration of the gaze point of the viewer in such further images may be calculated at such time from such further images.

In some embodiments, a processor may measure a duration of the period from when an instruction is given to look at an object, or from when the user actually looks at the object, and until the processor detects that the user has looked away from or been distracted away from the object. In some embodiments, a processor may issue a signal by way of an output device, informing the user that he has looked away from the relevant object on the screen.

In some embodiments, a system may capture an image of eyes of a viewer and track the eyes in further images. One or more objects may be displayed on an electronic display, and an instruction may be issued to the user to look at one of the objects. The eyes of the user may be tracked in further images until they fixate. Further images may be captured to determine that the viewer does not look away from the fixation point. Such a looking away may be characterized or detected by a saccadic movement of the eyes during a period when the user is supposed to be looking at a particular object. The viewer's gaze may be calibrated as being fixed on the displayed object close to a period when a new instruction is given to the user, and an instruction may then be issued to look at another object. The user's eyes may be tracked to determine a point of gaze in further images to determine whether the viewer changes his point of gaze to the new relevant object that was the subject of the most recent instruction. The eyes may again be tracked for fixation as an indication that the user continues to focus on the new, relevant object, or for a saccadic movement as an indication that the user has looked away from the object.

Reference is made to FIG. 4 a flow diagram in accordance with an embodiment of the invention. Embodiments of the invention may include a method of determining a speed of response by a user to an instruction to view a displayed object. In blocks 400 and 402, a user may look at a display and an image of the user's eyes may be captured in a first image. The user may be instructed to look at an object that is being display or that is to be displayed on an electronic display. In block 404, the object may be presented to the user on the display, either before, after or concurrently with the instruction. In block 406, a second image of the user's eyes may be captured, and in Block 408, a determination may be made from such second image that the user is looking at the object. In block 408, a calculation may be made that the user is looking at the object. of the period lapsed between the second image and for example the earlier of the display of the object or the issuance of the instruction.

I claim:

1. A method of determining whether a user is continuously looking at a displayed object, the method comprising:
displaying, by a processor, an object at a predetermined position on an electronic display;
instructing, by an output device associated with said processor, a user to look at said object;
capturing, by an imager associated with said processor, at least one image of eyes of said user after said instruction;
determining, by said processor, from said at least one image that said user is looking at said object;
tracking, by said processor, a movement of said eyes to determine saccadic eye movement by said user; and
determining, by said processor, from said tracking whether said user has looked away from said object upon detection of said saccadic eye movement.

2. The method as in claim 1, wherein said capturing comprises capturing said image with an imager at a known position relative to said electronic display, and wherein said determining that said user is looking at said object is determined in accordance with the known position of the imager relative to said electronic display.

3. The method as in claim 1, wherein said object comprises a first object, and further comprising:
displaying, by said processor, a second object on said display;
instructing, by said output device, said user to look at said second object;
capturing, by said imager, an image of said eyes of said user at a first time, said first time being proximate to said instructing said user to look at said second object; and
determining, by said processor, a gaze of said user at said first object at a second time proximate to said second time.

4. The method as in claim 1, comprising measuring a duration of a period from said determining that said user is looking at said object until said user looks away from said object.

5. The method as in claim 1, comprising issuing a signal that said user has looked away from said object.

6. A system comprising:
a mobile electronic display screen;
a processor;
a camera at a known position and orientation to said screen; and
an output device associated with said processor;
wherein
said screen is to display at least one object at a predetermined position on said screen;
said output device is to instruct a user to look at said at least one object;
said camera is to continuously capture images of a viewer of said screen;
said processor is to determine from said images whether said viewer looks away from said at least one object based on detected saccadic eye movement by said user; and
said processor is to issue a signal if said viewer looks away from said at least one object.

7. The system as in claim 6, wherein said at least one object displayed by said screen is a first object and wherein said images are a first set of images, and wherein:
said screen is to display a second object;
said output device is to instruct said viewer to look at said second object;
said camera is to capture a second set of images of said viewer after said output device instructs said viewer to look at said second object; and
said processor is to determine from said second set of images that said viewer has looked at said second object.

8. The system as in claim 6, wherein said processor is to calculate a duration of a period between start of said instruction by said output device and a time when said viewer looks away from said at least one object.

9. The system as in claim 8, wherein said processor is to alter said instruction to be issued by said output device in response to said calculated duration.

10. The system as in claim 6, wherein said output device is to issue a signal to said viewer in response to said signal from said processor.

11. A method of determining a speed of response to an instruction to view at least one displayed object, the method comprising:
capturing, by an imager, a first image of eyes of a user;
instructing, by an output device, a user to look at at least one object on an electronic display;
displaying, by a processor, said at least one object at a predetermined position on said electronic display;
capturing a second image of said eyes of said user after said instruction;
determining from said second image that said user is looking at the at least one object upon detection of saccadic eye movement by said user; and
calculating a time between said instruction and said capturing of said second image.

12. The method as in claim 11, wherein said instructing comprises instructing said user to look at an object from a plurality of objects on said electronic display.

13. The method as in claim 1, further comprising moving, by said processor, said object across said electronic display.

14. The system as in claim 6, wherein said processor is to determine from said images a gaze of said user at said at least one object.

15. The method as in claim 11, further comprising determining, by said processor, a gaze of said user at said first object.

* * * * *